United States Patent
Forbes et al.

(10) Patent No.: US 9,345,353 B2
(45) Date of Patent: May 24, 2016

(54) PORTABLE SHOPPING CART BEVERAGE CARRIER

(71) Applicants: Andrew James Forbes, Orangeville (CA); Kelly Sarah Zammit, Orangeville (CA)

(72) Inventors: Andrew James Forbes, Orangeville (CA); Kelly Sarah Zammit, Orangeville (CA)

( * ) Notice: Subject to any disclaimer, the term of this patent is extended or adjusted under 35 U.S.C. 154(b) by 0 days.

(21) Appl. No.: 14/208,637

(22) Filed: Mar. 13, 2014

(65) Prior Publication Data

US 2014/0284443 A1    Sep. 25, 2014

(30) Foreign Application Priority Data

Mar. 21, 2013    (CA) ..................................... 2810315

(51) Int. Cl.
*A47K 1/08*    (2006.01)
*A47G 23/02*    (2006.01)
*B62B 5/00*    (2006.01)
*G09F 23/00*    (2006.01)
*G09F 21/04*    (2006.01)
*B62B 3/14*    (2006.01)
(Continued)

(52) U.S. Cl.
CPC ......... *A47G 23/0216* (2013.01); *A47G 23/0225* (2013.01); *B62B 3/1472* (2013.01); *B62B 5/00* (2013.01); *B62B 9/12* (2013.01); *F16M 13/02* (2013.01); *G09F 21/04* (2013.01); *G09F 23/00* (2013.01); *B62B 2202/023* (2013.01)

(58) Field of Classification Search
CPC ........... A47F 7/28; A47F 7/283; A47B 73/00; A47B 73/006; A47B 73/002; A47B 81/007; A47B 3/004; A47G 23/0216; A47G 23/0241; A47G 23/0208; A47G 23/02

USPC ........... 248/311.2, 311.3, 313, 229.1, 229.13, 248/226.11, 230.1, 230.4, 231.51; 211/74; 224/411, 401, 400; 220/737
See application file for complete search history.

(56) References Cited

U.S. PATENT DOCUMENTS

| | | | |
|---|---|---|---|
| 2,633,278 A | | 3/1953 | Muniz |
| 3,734,439 A | * | 5/1973 | Wintz ....................... 248/224.51 |
| 4,256,281 A | | 3/1981 | Harris et al. |

(Continued)

FOREIGN PATENT DOCUMENTS

| | | |
|---|---|---|
| CA | 1125242 | 6/1982 |
| CA | 1257626 | 7/1989 |

(Continued)

OTHER PUBLICATIONS

Office Action for related corresponding application CA2,810,315 dated Aug. 19, 2013.

(Continued)

*Primary Examiner* — Steven Marsh (57) ABSTRACT

A compact and easy-to-install portable carrier for a beverage container that can be used on shopping carts and that also has space for marketing/branding/personalization. A portable carrier for a beverage container is provided having a clamp portion movably connected to a beverage container carrier portion that defines a container-receiving space. The clamp portion is movable between an extended position and a retracted position. In the extended position the clamp portion extends outwardly from the beverage container carrier portion in a first direction. In the retracted position the clamp portion is rotated relative to its orientation in the extended position and positioned substantially within the container-receiving space.

20 Claims, 9 Drawing Sheets

(51) Int. Cl.
  *B62B 9/12* (2006.01)
  *F16M 13/02* (2006.01)

(56) References Cited

U.S. PATENT DOCUMENTS

| | | | | |
|---|---|---|---|---|
| 4,434,961 | A | * | 3/1984 | Hoye ................... 248/311.2 |
| 4,678,195 | A | | 7/1987 | Trubiano |
| 4,887,784 | A | * | 12/1989 | Kayali ................... 248/311.2 |
| 4,955,516 | A | | 9/1990 | Satterfield |
| 4,984,722 | A | | 1/1991 | Moore |
| 5,014,956 | A | | 5/1991 | Kayali |
| 5,325,991 | A | | 7/1994 | Williams |
| 5,362,077 | A | | 11/1994 | Adamson |
| 5,441,225 | A | | 8/1995 | Hall |
| D367,998 | S | | 3/1996 | Graw |
| 5,522,527 | A | | 6/1996 | Tsai |
| 5,597,148 | A | | 1/1997 | Gospodarich |
| 5,715,571 | A | | 2/1998 | Fasano |
| 5,806,730 | A | | 9/1998 | Deno |
| 5,853,158 | A | * | 12/1998 | Riggle ................... 248/311.2 |
| 5,938,091 | A | | 8/1999 | Bergin et al. |
| 5,996,957 | A | | 12/1999 | Kurtz |
| 6,227,511 | B1 | | 5/2001 | De Costa |
| 6,601,813 | B1 | | 8/2003 | Kager et al. |
| 6,749,204 | B2 | | 6/2004 | Werner |
| 7,219,901 | B2 | | 5/2007 | Ryan |
| 7,284,737 | B2 | | 10/2007 | Kane |
| 7,475,884 | B2 | | 1/2009 | Ryan |
| D600,077 | S | * | 9/2009 | Barnes, Jr. ................... D7/620 |
| 7,959,121 | B1 | | 6/2011 | Barnes, Jr. |
| 8,245,894 | B2 | | 8/2012 | Buehler |
| 8,307,966 | B2 | | 11/2012 | Cummins |
| 8,360,441 | B2 | | 1/2013 | Caruso |
| 2002/0148868 | A1 | | 10/2002 | Dion-Bildstein et al. |
| 2003/0132590 | A1 | | 7/2003 | Werner |
| 2003/0197104 | A1 | * | 10/2003 | Heybl et al. ................... 248/311.2 |
| 2004/0129852 | A1 | | 7/2004 | Giampavolo |
| 2005/0199667 | A1 | | 9/2005 | Cappellino et al. |
| 2006/0022006 | A1 | | 2/2006 | Cruise |
| 2007/0045496 | A1 | * | 3/2007 | Kane ................... 248/313 |
| 2009/0206098 | A1 | * | 8/2009 | Garahan ................... 220/737 |
| 2009/0217497 | A1 | * | 9/2009 | Lans ................... 24/499 |

FOREIGN PATENT DOCUMENTS

| | | |
|---|---|---|
| CA | 2205141 | 11/1998 |
| CA | 2262028 | 1/1999 |
| CA | 2459150 | 8/2005 |
| CA | 2541399 | 7/2007 |
| CA | 2720604 | 7/2011 |

OTHER PUBLICATIONS

Office Action for related corresponding application CA2,810,315 dated Apr. 17, 2014.

* cited by examiner

PORTABLE SHOPPING CART BEVERAGE CARRIER

This application claims priority to Canadian patent application serial number 2,810,315, filed Mar. 21, 2013, the contents of which are incorporated herein by reference.

FIELD

Embodiments described herein generally relate to portable carriers for beverage containers.

BACKGROUND

Consumers today often go shopping with a coffee or drink in hand, but they struggle in the absence of a cup holder on their shopping cart.

Even though permanently fixed shopping cart cup holders exist, nearly all shopping carts typical of the styles found at shopping centers today are not equipped with them. This leaves the consumer with a problem: Where do I put my drink? They struggle by trying to balance it in the child seat area, or gripping the drink in their teeth, or holding it in one hand while struggling to steer the shopping cart with the other hand. If they have children with them, the problems are compounded.

SUMMARY

Various embodiments of the present invention provide a cup holder that can be transported with ease. Embodiments described herein provide a compact and easy-to-install portable carrier for a beverage container (herein after called a portable carrier) that can be installed with shopping carts and in various other circumstances where a portable carrier may be desirable such as with a bicycle or a stroller. In some embodiments, the portable carrier can also provide space for marketing and/or branding and/or personalization.

As will be apparent to the skilled reader the example embodiments of a novel portable carrier described herein may provide users and consumers with various benefits. For example, in some example embodiments the portable carrier may be:

Compact;
Easily attachable without the need for tools or expertise; and
Include space for marketing and/or branding and/or personalization.

The example embodiments of a portable carrier described herein may:

Provide a clamp portion adapted to grip the wide variety of cart handle cross-sections and sizes;
Provide a beverage container carrier portion adapted to receive beverage containers having various shapes and configurations such as tapered cups, pop cans, water bottles and baby bottles for example; and
Be movable from an extended position for use to a retracted position for storage, i.e. able to fold up.

The example embodiments of a portable carrier described herein may include:

A clamp portion having an upper clamp half and a lower clamp half that are adapted to grip various handles such as shopping cart handles with sufficient force to support the beverage container that is received in the beverage container carrier portion. In some embodiments, the upper half portion and lower half portion may include an elastomeric liner adhered to their respective inner surfaces to provide sufficient grip when gripping handles.

In some embodiments, the portable carrier is provided with a clamp portion that is as easy to use as a clothespin.

In some embodiments, the clamp portion can be movable from an extended position for gripping a handle to a compact retracted position for storage. For example, the portable carrier can be provided with a clamp pivot on an axis at a 45 degree angle to the direction of extension of the clamp portion. The clamp portion may be pivotable about the clamp pivot to move from the extended position to fold up to a very compact profile in the retracted position. This may allow consumers to fit a portable carrier in a purse or large pocket.

The versatility provided by various embodiments of a portable carrier described herein may allow users to mount the portable carrier forward or aft of a shopping cart handle, and thus provide the convenience of cup holders for an individual and their child who is positioned in the child seat. An example embodiment of a versatile portable carrier can be seen in FIG. 2. Embodiments of the portable carriers described herein can also be useful in other applications with similar handles such as strollers, bicycles, and so on.

In accordance with a first embodiment described herein, there is provided a portable carrier comprising a beverage container carrier portion configured to define a container-receiving space for receiving a beverage container in an upright position, the container-receiving space defining a container-receiving central axis extending through a center of the container-receiving space; a clamp portion having a clamp width dimension; and a connector for connecting the beverage container carrier portion and the clamp portion such that the clamp portion is movable between an extended position and a retracted position; wherein in the extended position the clamp portion extends outwardly from the beverage container carrier portion in a first direction outside the container-receiving space and the clamp width dimension is measurable in a second direction orthogonal to the container-receiving central axis; in the retracted position, the clamp portion is positioned substantially within the container-receiving space and is rotated relative to its orientation in the extended position so that the clamp width dimension is not orthogonal to the container-receiving central axis; and the first direction is not parallel with the container-receiving central axis when the clamp portion is in the retracted position.

In some embodiments the first direction is substantially orthogonal to the container-receiving central axis when the clamp portion is in the retracted position.

In some embodiments the first direction and second direction are substantially orthogonal.

In some embodiments, in the retracted position, the clamp portion is rotated relative to its orientation in the extended position so that the clamp width dimension is substantially parallel to the container-receiving central axis.

In some embodiments the connector is a pivot and the beverage container carrier portion and the clamp portion are pivotably connected about a pivot axis such that the clamp portion is pivotable between an extended position and a retracted position.

In some embodiments, in the extended position the clamp portion is positioned substantially along a plane normal to the container-receiving central axis; and the pivot axis is oriented at a 45 degree angle to the plane.

In some embodiments, the beverage container carrier portion has an inclined upper surface angled at 45 degrees from the plane; the clamp portion has an inclined lower surface angled at 45 degrees from the plane; and the beverage container carrier portion is pivotably attached to the clamp portion at the respective inclined surfaces such that they can pivot about the pivot axis.

In some embodiments the beverage container carrier portion further comprises an arcuate ring defining the container-receiving space.

In some embodiments, the arcuate ring is a semi-circular ring.

In some embodiments, the arcuate ring further comprises an upper ring portion having a first thickness and a lower ring portion having a second thickness; the distance between the upper ring portion and the lower ring portion defines a ring portion height dimension; and the ring portion height dimension is measureable in a direction parallel to the container-receiving central axis.

In some embodiments, the arcuate ring is frustro-conical and the first thickness is less than the second thickness.

In some alternate embodiments, the arcuate ring is substantially cylindrical and the first thickness is substantially the same as the second thickness.

In some embodiments, the clamp width dimension is less than the ring portion height dimension.

In some embodiments, the portable carrier further comprises a bottom support; the bottom support being connected to the beverage container carrier portion by a support connector such that the bottom support is movable from a support position to a storage position.

In some embodiments, in the support position the bottom support has a support width dimension measurable in a direction orthogonal to the container-receiving central axis; and in the storage position the bottom support has a support width dimension measurable in a direction substantially parallel to the container-receiving central axis.

In some embodiments, the beverage container carrier portion further comprises a support tab; and the bottom support is retained in the storage position by the support tab.

In some embodiments, the clamp portion further comprises an upper clamp half, a lower clamp half and a clamp connector for connecting the upper clamp half and lower clamp half such that the upper clamp half and lower clamp half are movable between an open position and a closed position.

In some embodiments, the clamp connector is a hinge pin and the upper clamp half and lower clamp half are pivotably connected about the hinge pin.

In some embodiments, the clamp connector further comprises a spring to retain the lower clamp half and upper clamp half in the closed position.

In some embodiments, one of the lower clamp half and the upper clamp half comprises a sawtooth shaped lock adapted to receive the other one of the lower clamp half and upper clamp half to retain the lower clamp half and upper clamp half in the closed position.

In some embodiments, one of the lower clamp half and the upper clamp half comprises a stud and wing-nut and the other one of the lower clamp half and upper clamp half is adapted to receive the stud and wing-nut to retain the lower clamp half and upper clamp half in the closed position.

In some embodiments, the beverage container carrier portion further comprises a dead-stop tab to prevent the clamp portion from pivoting beyond either of the extended position and retracted position.

In some embodiments, the upper clamp half and lower clamp half comprise an elastomer adhered to a surface thereof.

Further aspects and advantages of the embodiments described herein will appear from the following description taken together with the accompanying drawings.

DETAILED DESCRIPTION

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

Figure 1:
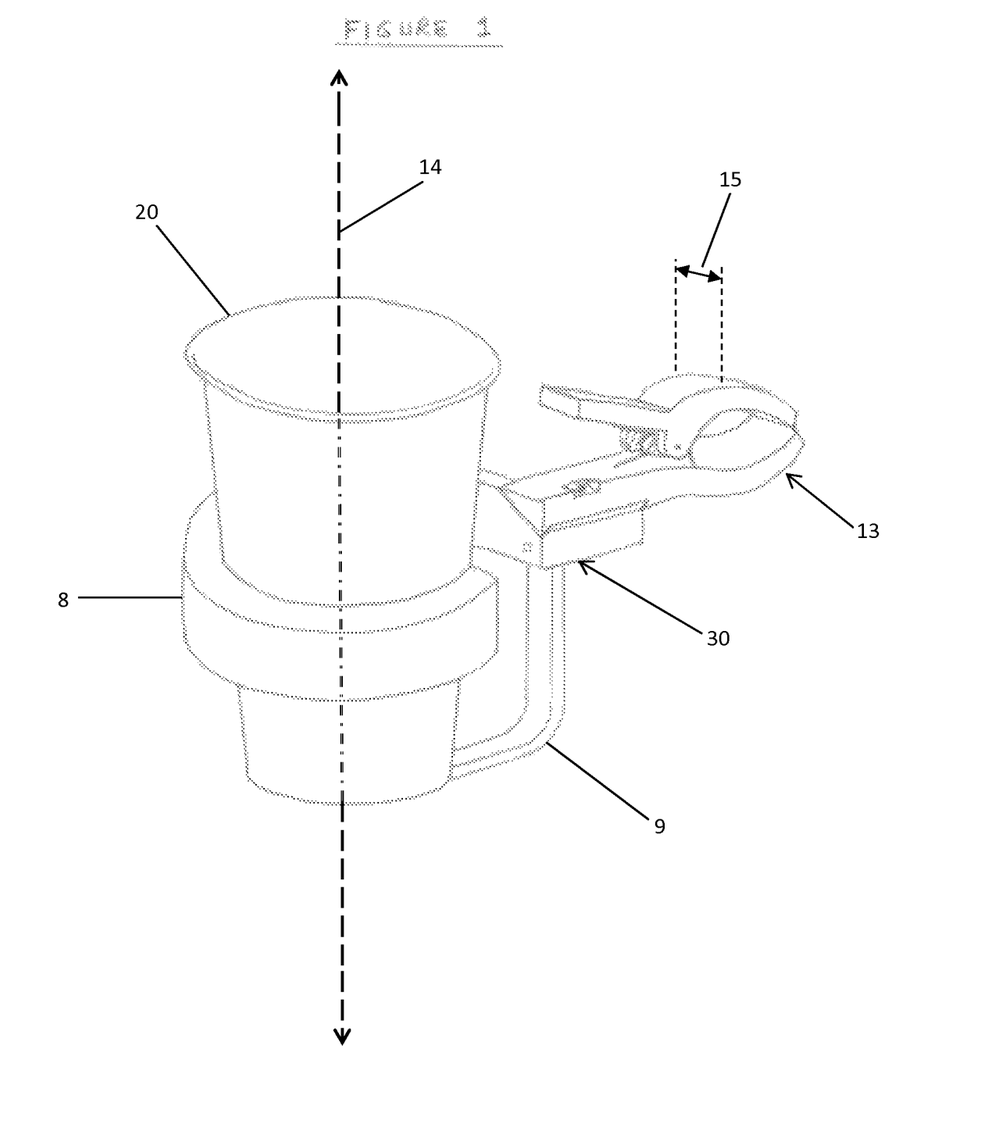
FIG. 1 shows a general drawing of a portable carrier in accordance with at least one embodiment.

Referring now to FIG. 1 shown therein is a general drawing of a portable carrier 30 for a shopping cart in accordance with an embodiment. The portable carrier 30 is shown holding a beverage container 20 in a container-receiving space. Beverage container 20 could be any sort of beverage container such as, for example, tapered and non-tapered cups, cans, and bottles. The portable carrier 30 includes a clamp portion 13 having a clamp width dimension 15 as well as a cup holder ring portion 8 and a bottom support portion 9. The cup holder ring portion 8 defines a container-receiving space that has a central axis 14 extending through the center of the container-receiving space.

Figure 2:
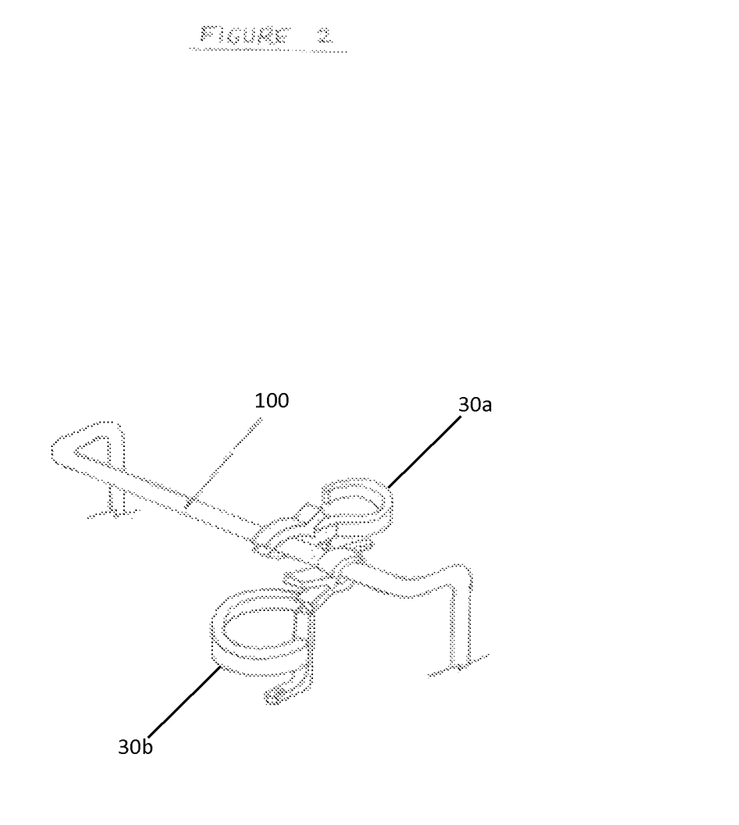
FIG. 2 shows a pair of portable carriers attached to a shopping cart handle in accordance with at least one embodiment.

Referring now to FIG. 2 shown therein is a pair of portable carriers 30a and 30b attached to a shopping cart handle 100 using a clamp. As shown in FIG. 2, portable carriers 30a and 30b are able to grip shopping cart handles from a forward or aft position providing consumers with versatility when using embodiments of the portable carriers described herein. The versatility provided by the portable carriers 30a and 30b shown in FIG. 2 may be beneficial in various circumstances, such as when a child is positioned in a child seat of a shopping cart.

Figure 3:
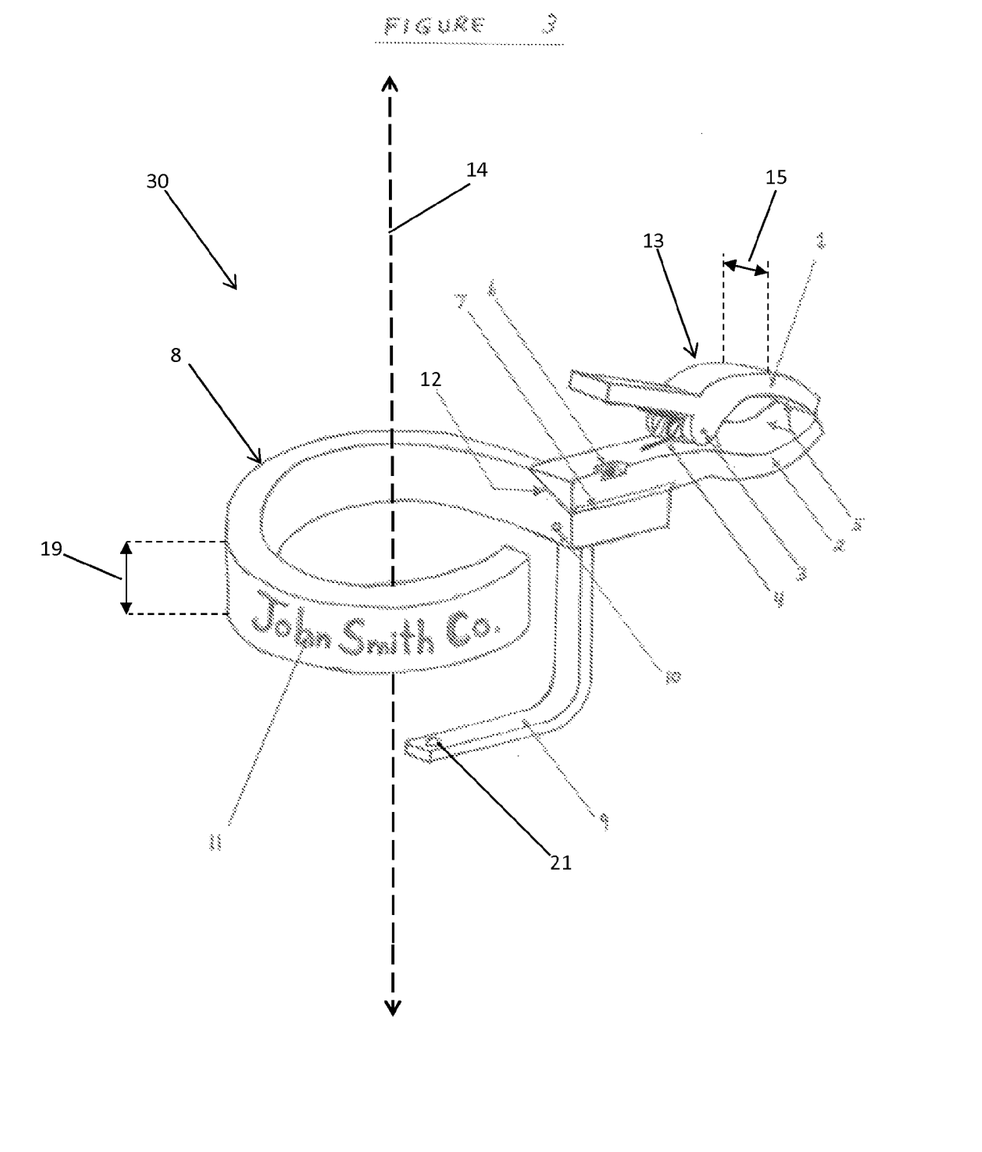
FIG. 3 shows a parts drawing of a portable carrier in accordance with at least one embodiment.

Referring now to FIG. 3 shown therein is a parts drawing of a portable carrier 30 in accordance with at least one embodiment. Portable carrier 30 has a clamp portion 13, a cup holder ring portion 8 and a bottom support portion 9. The cup holder ring portion 8 defines a container-receiving space for receiving a beverage container in an upright position. The container-receiving space has a container-receiving central axis 14 extending through the center of the container-receiving space. In some embodiments, the cup holder ring portion 8 may be a tapered or frustro-conical ring with a first thickness of an upper ring portion being greater than a second thickness of a lower ring portion. The cup holder ring portion 8 has a ring portion height dimension 19.

The cup holder ring portion 8 may also be provided with a branding space 11. The branding space 11 allows manufacturers of the portable carrier 30 to put a mark or brand on the cup holder ring portion 8 that is not obscured when the portable carrier 30 is folded for storage. The branding space 11 can also be used to customize or personalize the portable carrier 30.

In FIG. 3, the bottom support portion 9 is shown in an extended position. The bottom support portion 9 may be pivotably connected to cup holder ring portion 8 by bottom support pivot pin 10. The bottom support portion 9 includes a bottom support tab 21 that may be received by a divot in the cup holder ring portion 8 when the bottom support portion 9 is raised into a storage position to secure the bottom support portion 9 in the storage position.

The clamp portion 13 includes an upper clamp half 1 and a lower clamp half 2 pivotably connected by clamp hinge pin 3. In some embodiments, the upper clamp half 1 and the lower clamp half 2 may have an elastomer 5 attached to their respective gripping surfaces to increase the co-efficient of friction between the clamp and a shopping cart handle.

In some embodiments, the clamp tension is provided by a clamp spring 4. In some embodiments, the clamp tension can also be provided by a clamp portion using a stud and wingnut design (shown in FIGS. 4A and 4B). In further embodiments, the clamp tension can also be provided by a clamp portion using a sawtooth shaped lock (shown in FIG. 5).

Figure 8A:
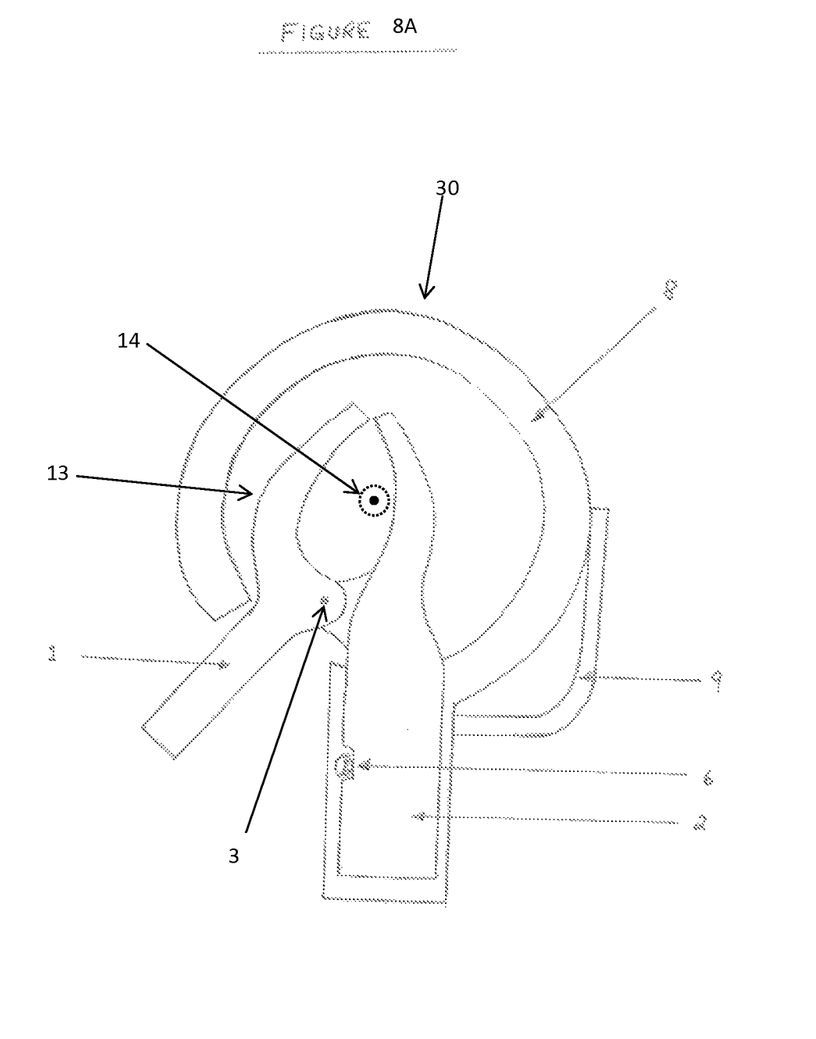
FIG. 8A shows a top view of a portable carrier folded up in a retracted position for storage in accordance with at least one embodiment.

The clamp portion 13 is connected to the cup holder ring portion 8 such that the clamp portion 13 is movable between an extended position (as shown in FIG. 3) and a retracted position (as shown in FIG. 8A). In the embodiment shown in FIG. 3, the clamp portion 13 is pivotably connected to the cup holder ring portion 8 via clamp pivot 6. The clamp portion 13 is able to fold via the clamp pivot 6 for compact storage. The clamp pivot 6 may be on a plane of 45 degrees from horizontal (shown by 45 degree plane clamp pivot 12) which allows the clamp portion 13 to fold open to a vertical position for use and fold closed to a horizontal position inside the cup holder ring portion 8 for compact storage (as shown in FIG. 8A).

As will be apparent to a skilled reader, other configurations can be used to allow the clamp portion 13 to fold from a vertical orientation in an extended position to a horizontal orientation inside the cup holder ring portion 8 in a retracted position. For example, the clamp portion 13 can include a second pivot (not shown) that allows the clamp portion 13 to rotate from a vertical position to a horizontal position while clamp pivot 6 allows the clamp portion 13 to move from the extended position to a retracted position within the cup holder ring portion 8. In this case, clamp pivot 6 may not be on a plane of 45 degrees from horizontal.

In some embodiments, the clamp pivot 6 may incorporate a spring-loaded detent to retain it in its open or closed positions.

In some embodiments, the pivot design may incorporate a clamp pivot dead-stop tab 7. The clamp pivot dead-stop tab 7 can be used to prevent over-rotation of the clamp portion 13 when the clamp portion 13 is being folded open or closed, and to prevent over-rotation when the portable carrier 30 is in use and supporting the weight of a beverage.

Clamp portion 13 has a clamp width dimension 15 measurable in a direction orthogonal to the container-receiving central axis 14 when the clamp portion 13 is in the extended position. In the retracted position, the clamp portion 13 can be rotated relative to its orientation in the extended position so that the clamp width dimension 15 is not orthogonal to the container-receiving central axis 14. In some embodiments, the clamp width dimension 15 can be smaller than the ring portion height dimension 19 for an even more compact retracted position.

Figure 4A:
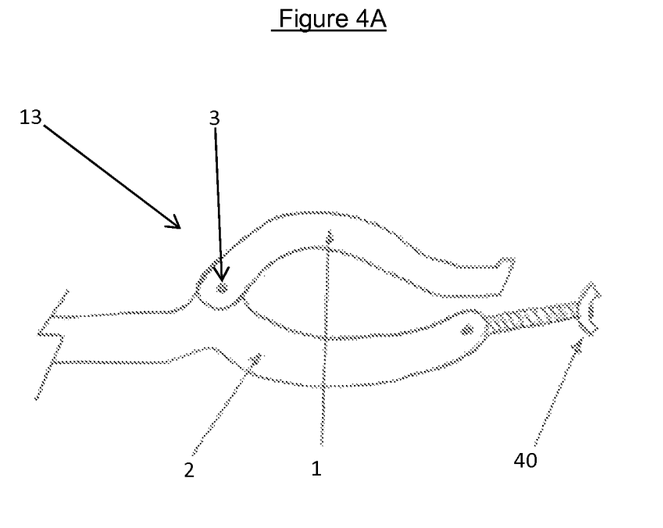
FIG. 4A shows a side view of a portable carrier clamp portion where clamp tension can be provided using a stud and wing-nut design in accordance with at least one embodiment.
Figure 4B:
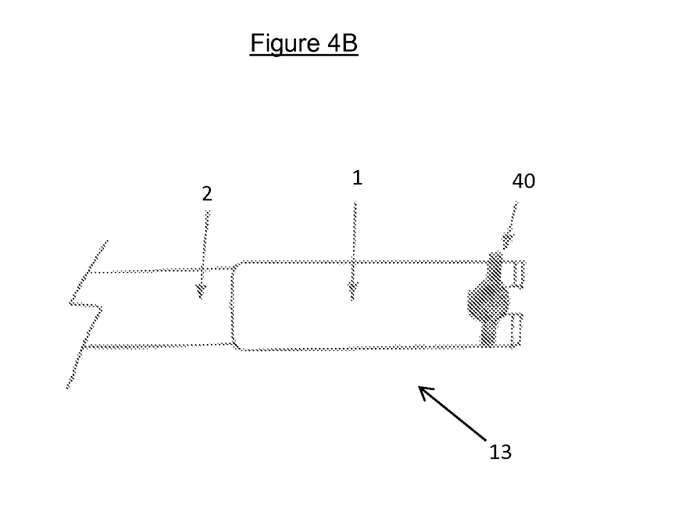
FIG. 4B shows a top view of the portable carrier clamp portion shown in FIG. 4A.

Referring now to FIG. 4 shown therein is an embodiment of a portable carrier clamp portion 13 having clamp tension provided by a stud and wingnut design. The clamp portion 13 has an upper clamp half 1 connected to a lower clamp half 2 by a clamp pivot pin 3. In this embodiment, the clamp tension is provided by a stud and wingnut 40 extending from the distal end of the lower clamp half 2 that is adapted to be received in the upper clamp half 1. When a consumer positions the clamp portion 13 around a suitable handle, the clamp portion 13 can be held in place by securing the stud and wingnut 40 in the distal end of the upper clamp half 1.

FIG. 4A shows a side view of a portable carrier clamp portion 13 having the clamp tension provided by a stud and wingnut design. FIG. 4B shows a top view of the portable carrier clamp portion 13 of FIG. 4A where the stud and wingnut 40 has been secured in the distal end of the upper clamp half 1.

Figure 5:
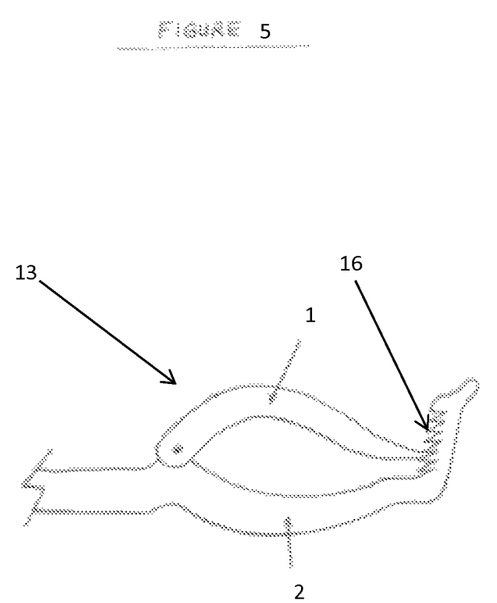
FIG. 5 shows a portable carrier clamp portion where clamp tension can be provided using a sawtooth shaped lock.

Referring now to FIG. 5, shown therein is an embodiment of a portable carrier clamp portion 13 having clamp tension provided by a sawtooth shaped lock 16. The lower clamp half 2 may have a sawtooth shaped distal end that includes a plurality of teeth adapted to securely receive the distal end of the upper clamp half 1.

Figure 6A:
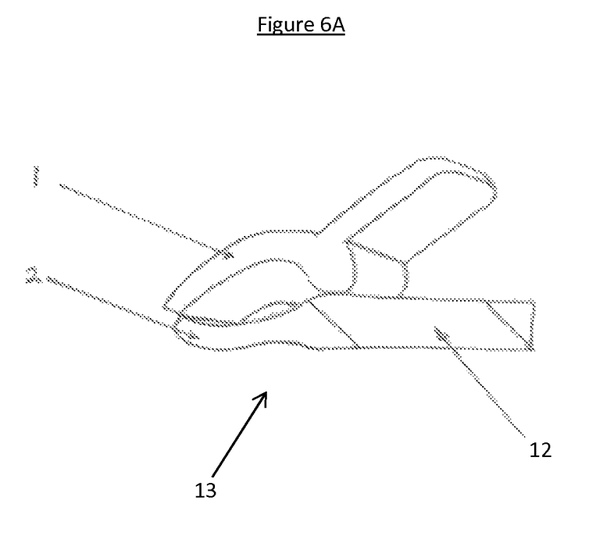
FIG. 6A shows a clamp portion of a portable carrier having a 45 degree plane clamp pivot in accordance with at least one embodiment.
Figure 6B:
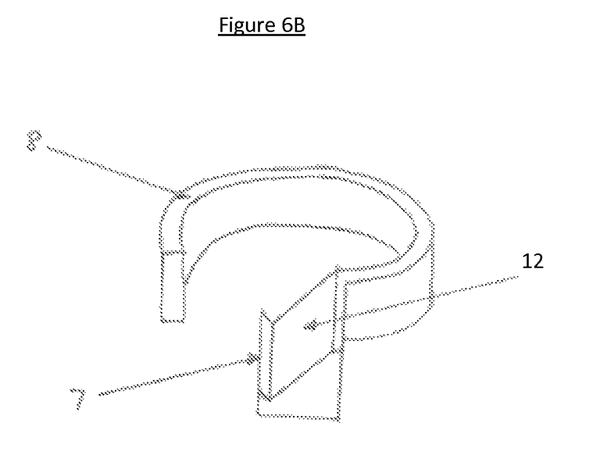
FIG. 6B shows a beverage container carrier portion of a portable carrier having a 45 degree plane clamp pivot corresponding to the clamp portion shown in FIG. 6A.

Referring now to FIG. 6, shown therein is an embodiment of a portable carrier having a 45 degree plane clamp pivot 12. In this embodiment, clamp pivot 6 (not shown) is provided at 45 degrees from horizontal.

FIG. 6A shows an embodiment of a clamp portion 13 where the clamp portion 13 has a 45 degree plane clamp pivot 12.

FIG. 6B shows an embodiment of a cup holder ring portion 8 adapted to receive a 45 degree plane clamp pivot 12 and comprising a clamp pivot dead-stop tab 7.

Figure 7:
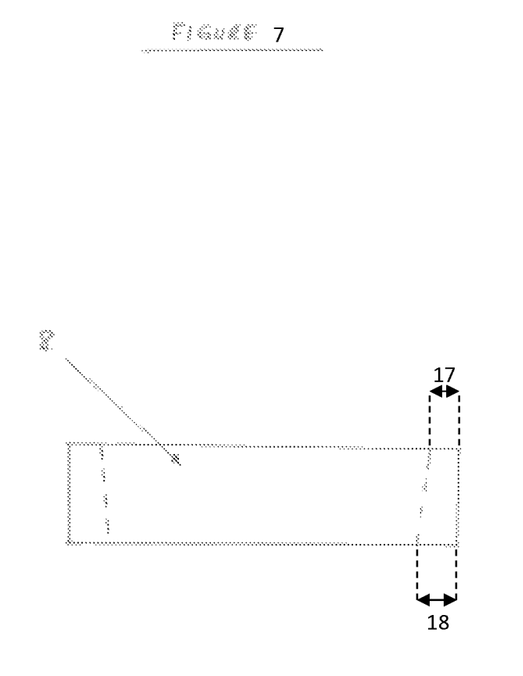
FIG. 7 shows a cup holder ring portion having an inside diameter taper in accordance with at least one embodiment.

Referring now to FIG. 7, shown therein is an embodiment of a cup holder ring portion 8 for a portable carrier with a tapered inside diameter. The cup holder ring portion 8 has an upper ring portion with a first thickness 17 that is smaller than a second thickness 18 of a lower ring portion such that the cup holder ring portion 8 has a frustro-conical shape. In alternate embodiments, the cup holder ring portion 8 may have a non-tapered inside diameter such that the cup holder ring portion 8 has a substantially cylindrical shape.

Referring now to FIG. 8A, shown therein is an embodiment of a portable carrier 30 in a retracted or storage position. In FIG. 8A, cup holder ring portion 8 is shown with a semi-circular design to accommodate a section of the upper clamp half 1 that extends beyond the cup holder ring portion 8 when folded for compact storage. A bottom support portion 9 is also shown in a raised position for storage. The container-receiving space central axis 14 (shown extending into and out of FIG. 8A) extends through the center of cup holder ring portion 8. Similarly, the clamp width dimension 15 extends in a direction substantially parallel to the central axis 14.

A portable carrier 30 can use the bottom support portion 9 in conjunction with cup holder ring portion 8 to hold beverage containers having an outside diameter less than the inside diameter of the cup holder ring portion 8, or beverage containers having non-tapered sides. In some embodiments, the bottom support portion 9 is operable to pivot to be lowered into position for use and is operable to be raised into a raised position for storage. When in the raised storage position, bottom support portion 9 may be secured in place using a bottom support tab 21 that can be received by a divot in the cup holder ring portion 8.

Figure 8B:
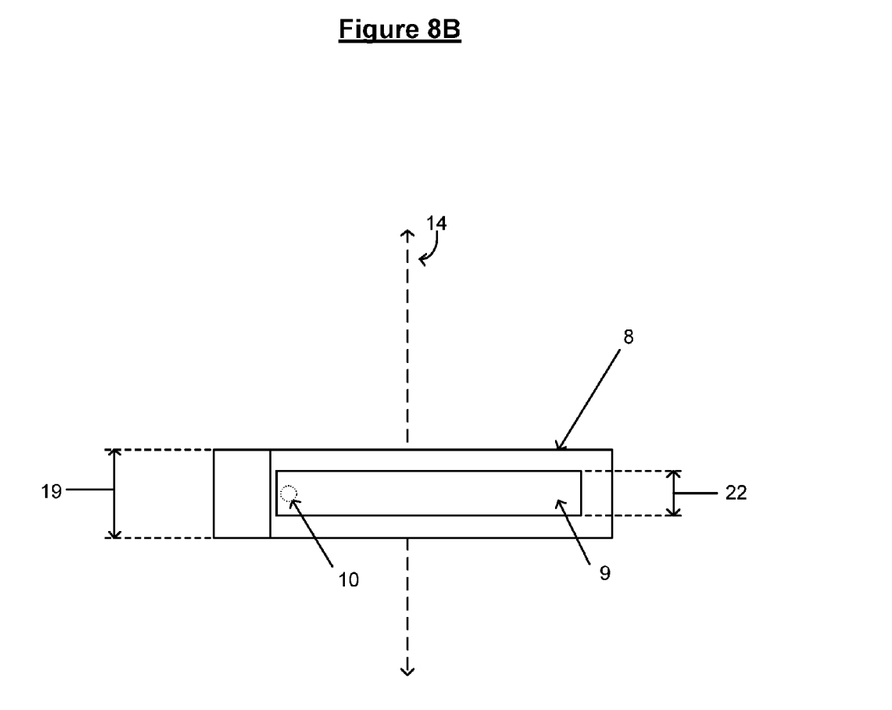
FIG. 8B shows a side view of the portable carrier in a retracted position shown in FIG. 8A with a bottom support portion in a storage position.

FIG. 8B provides a side view of portable carrier 30 in the retracted position. As shown in FIG. 8B, the bottom support portion 9 has a support width dimension 22 that is substantially parallel to the central axis 14 when in the retracted position. The support width dimension 22 can also be less than ring portion height dimension 19 to provide a compact storage profile for the portable carrier 30 when in the retracted position.

In this embodiment, the clamp width dimension 15 is less than the ring portion height dimension 19. Accordingly, the clamp portion 13 does not extend above or below the cup holder ring portion 8 when in the retracted position and cannot be seen in the side view shown in FIG. 8B. Having a clamp width dimension 15 less than the ring portion height dimension 19 provides portable carrier 30 with a compact profile when in the retracted position. In some embodiments, the ring portion height dimension 19 can be less than 1 inch to provide the portable carrier 30 with compact size for storage. Both, the clamp width dimension 15 and the support width dimension 22 can also be less than 1 inch in various embodiments to provide a compact retracted position.

In some embodiments, this allows the clamp portion 13 to be entirely contained within the cup holder ring portion 8 when in the retracted position. As mentioned above, the clamp portion 13 cannot be seen in the side view shown in FIG. 8B as the clamp portion 13 is entirely contained within the cup holder ring portion 8. For example, where the upper clamp half 1 does not have a section extending beyond the cup holder ring portion 8 in the retracted position this can provide additional compactness. The added compactness may allow consumers to fit a portable carrier 30 in a purse or large pocket.

In some embodiments, the portable carrier incorporates a space for personalization and/or marketing and/or branding purposes. In these embodiments, the space for personalization and/or marketing and/or branding is not concealed when the portable carrier is folded closed for storage.

Generally, embodiments of a portable carrier include 3 main components: a clamp, a cup holder ring, and a bottom support. Each of these components can be made of a material that offers suitable strength while minimizing bulk and weight (e.g. a plastic such as HDPE or nylon).

The clamp portion can consist of an upper clamp half, such as upper clamp half 1, and a lower clamp half, such as lower clamp half 2, having a size and shape suitable to grip a variety of shopping cart handle profiles and shapes. The clamp halves can be joined using a hinge pin, such as clamp hinge pin 3, that they can pivot on. A spring, such as clamp spring 4, can be used to provide sufficient clamping pressure to support the weight of a drink and the cup holder itself when the clamp portion is engaged with a handle. Various types of springs can be used such as, but not limited to, a torsion spring, a wave spring, and flat spring steel. The clamp portion can grip the shopping cart handle with sufficient force to stabilize a beverage in an upright position once it has been placed in the portable carrier.

In some embodiments, the areas of the clamp which contact the shopping cart handle can have a suitable elastomer, such as elastomer 5, adhered to them using a suitable adhesive. An elastomeric lining can increase the co-efficient of friction between the clamp and the shopping cart handle, thus providing an improved grip regardless of vibration or duration of use. The clamp assembly can be squeezed open with one hand to clamp it to, or un-clamp it from, a shopping cart handle.

In some embodiments, the clamp may use a stud and wingnut for clamp tension.

In some embodiments, the clamp may use a "sawtooth" shaped lock for clamp tension.

The cup holder ring can be designed to hold a wide variety of disposable and re-usable drink cups with tapered sides. The cup holder ring can also hold non-tapered beverage containers such pop cans, water bottles, and baby bottles particularly when used with a bottom support. The inside diameter of the holder can be tapered to offer a secure grip on a drink with tapered sides. In embodiments having a tapered cup holder ring, the taper is widest at the top of the cup holder ring and narrowest at the bottom of the cup holder ring. The cup holder ring is sized and shaped to be suitable for assorted beverage containers and manufactured of materials that offer suitable support for the drinking vessel. The vertical outer surface of the outside diameter can also be provided with space for personalization and/or marketing purposes.

The bottom support can assist in accommodating drinking vessels which are either very small, or have non-tapered sides (i.e. pop cans, water bottles, baby bottles). The bottom support can also be used with tapered beverage containers to provide additional support. In embodiments of the portable carrier using a 45 degree clamp pivot, the bottom support can be attached to the cup holder ring beneath the 45 degree clamp pivot. The bottom support can pivot between a lowered position for use, and a raised position for storage. When raised for storage, the bottom support can retained in the storage position using a tab on the bottom support that can be received by a divot built into the cup holder ring.

When not in use, the clamp assembly and bottom support can be folded up. The clamp can be rotated or pivoted to be stored within the cup holder ring. The clamp and cup holder ring can be joined at a pivot point. The pivot can incorporate a spring loaded detent to ensure that the clamp snaps securely into its fully extended position, or its fully retracted position. The pivot can also incorporate a deadstop tab to prevent over-rotation of the clamp when under load (i.e. When a drink is being supported).

In some cases, the pivot is operable to make the clamp "vertical" when extended for use, and "horizontal" when retracted inside the cup holder ring in a retracted or storage position. It is desirable to have the retracted clamp in a horizontal position for compact storage. In accordance with an example embodiment, this is accomplished by setting the pivot plane at 45 degrees from horizontal. In accordance with another example embodiment, this can be accomplished through the use of a second clamp pivot that allows the clamp to rotate between a horizontal position and a vertical position.

Directions for the use of a portable carrier in accordance with an embodiment:

1. Grasp the cup holder ring and rotate the clamp out to its extended position. Ensure the clamp snaps into place.

2. Squeeze the clamp open and clamp it onto the shopping cart handle, ensuring the cup holder is level. Adjust for level as need be.
3. Lower the bottom support.
4. Place your drinking vessel in the cup holder.

Directions for storage of a portable carrier in accordance with an embodiment:
1. Remove any drinking vessel.
2. Raise the bottom support upward until it snaps into place against the cup holder ring.
3. Squeeze the clamp open to remove the cup holder from the shopping cart.
4. Grasp the cup holder ring and rotate the clamp in to its retracted position within the cup holder ring. Ensure it snaps into place.

A number of embodiments have been described herein. However, it will be understood by persons skilled in the art that other variants and modifications may be made without departing from the scope of the embodiments as defined in the claims appended hereto.

The invention claimed is:

1. A portable carrier for a beverage container comprising:
a beverage container carrier portion configured to define a container-receiving space for receiving a beverage container in an upright position, the container-receiving space defining a container-receiving central axis extending through a center of the container-receiving space;
a clamp portion having a clamp hinge pin defining a clamp hinge axis of rotation and a clamp width dimension, the clamp width dimension being substantially parallel to the clamp hinge axis of rotation; and
a connector for connecting the beverage container carrier portion and the clamp portion such that the clamp portion is movable between an extended position and a retracted position; wherein
in the extended position, the clamp portion extends outwardly from the beverage container carrier portion in a first direction outside the container-receiving space, the clamp width dimension is measurable in a second direction orthogonal to the container-receiving central axis, and the clamp hinge axis of rotation is orthogonal to the container-receiving central axis;
in the retracted position, the clamp portion is positioned substantially within the container-receiving space and is rotated relative to its orientation in the extended position so that the clamp width dimension and the clamp hinge axis of rotation are not orthogonal to the container-receiving central axis; and
the first direction is not parallel with the container-receiving central axis when the clamp portion is in the retracted position; and
wherein the connector is a pivot and the beverage container carrier portion and the clamp portion are pivotably connected about a connector pivot axis such that the clamp portion is pivotable between an extended position and a retracted position;
wherein in the extended position the clamp portion is positioned substantially along a plane normal to the container-receiving central axis; and
the connector pivot axis is oriented at a 45 degree angle to the plane; and
wherein the beverage container carrier portion has an inclined upper surface angled at 45 degrees from the plane;
the clamp portion has an inclined lower surface angled at 45 degrees from the plane; and the beverage container carrier portion is pivotably attached to the clamp portion at the respective inclined surfaces such that they can pivot about the connector pivot axis.

2. The portable carrier of claim 1, wherein the first direction is substantially orthogonal to the container-receiving central axis when the clamp portion is in the retracted position.

3. The portable carrier of claim 2, wherein the first direction and second direction are substantially orthogonal.

4. The portable carrier of claim 1, wherein in the retracted position, the clamp portion is rotated relative to its orientation in the extended position so that the clamp width dimension and the clamp hinge axis of rotation are substantially parallel to the container-receiving central axis.

5. The portable carrier of claim 1, wherein the beverage container carrier portion comprises an arcuate ring defining the container-receiving space.

6. The portable carrier of claim 5 wherein the arcuate ring is a semi-circular ring.

7. The portable carrier of claim 5 wherein:
the arcuate ring comprises an upper ring portion having a first thickness and a lower ring portion having a second thickness;
the distance between the upper ring portion and the lower ring portion defines a ring portion height dimension; and
the ring portion height dimension is measureable in a direction parallel to the container-receiving central axis.

8. The portable carrier of claim 7, wherein the arcuate ring is frustro-conical and the first thickness is less than the second thickness.

9. The portable carrier of claim 7, wherein the arcuate ring is substantially cylindrical and the first thickness is substantially the same as the second thickness.

10. The portable carrier of claim 7, wherein the clamp width dimension is less than the ring portion height dimension.

11. The portable carrier of claim 1 wherein the portable carrier further comprises a bottom support;
the bottom support being connected to the beverage container carrier portion by a support connector such that the bottom support is movable from a support position to a storage position.

12. The portable carrier of claim 11 wherein in the support position the bottom support has a support width dimension measurable in a direction orthogonal to the container-receiving central axis; and
in the storage position the bottom support has a support width dimension measurable in a direction substantially parallel to the container-receiving central axis.

13. The portable carrier of claim 11 wherein the beverage container carrier portion further comprises a support tab; and
the bottom support is retained in the storage position by the support tab.

14. The portable carrier of claim 1 wherein the clamp portion further comprises an upper clamp half, a lower clamp half and a clamp connector for connecting the upper clamp half and lower clamp half such that the upper clamp half and lower clamp half are movable between an open position and a closed position.

15. The portable carrier of claim 14 wherein the clamp connector is a hinge pin, the upper clamp half and lower clamp half are pivotably connected about the hinge pin, and the upper clamp half and the lower clamp half can pivot about the clamp hinge axis of rotation.

16. The portable carrier of claim 15 wherein the clamp connector further comprises a spring to retain the lower clamp half and upper clamp half in the closed position.

17. The portable carrier of claim 15 wherein one of the lower clamp half and the upper clamp half comprises a sawtooth shaped lock adapted to receive the other one of the lower clamp half and upper clamp half to retain the lower clamp half and upper clamp half in the closed position.

18. The portable carrier of claim 14 wherein one of the lower clamp half and the upper clamp half comprises a stud and wing-nut and the other one of the lower clamp half and upper clamp half is adapted to receive the stud and wing-nut to retain the lower clamp half and upper clamp half in the closed position.

19. The portable carrier of claim 1 wherein the beverage container carrier portion further comprises a dead-stop tab to prevent the clamp portion from pivoting beyond either of the extended position and retracted position.

20. The portable carrier of claim 14 wherein the upper clamp half and lower clamp half comprise an elastomer adhered to a surface thereof.

\* \* \* \* \*